(12) United States Patent
Collinge et al.

(10) Patent No.: US 10,956,904 B2
(45) Date of Patent: Mar. 23, 2021

(54) SYSTEM AND METHOD FOR END-TO-END KEY MANAGEMENT

(71) Applicant: MasterCard International Incorporated, Purchase, NY (US)

(72) Inventors: Mehdi Collinge, Mont-Sainte-Aldegonde (BE); Mohamed Abou El Enin, Auderghem (BE); Andrea Bacioccola, London (GB); Michael Ward, Taunton (GB)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 518 days.

(21) Appl. No.: 15/218,842

(22) Filed: Jul. 25, 2016

(65) Prior Publication Data
US 2018/0025353 A1    Jan. 25, 2018

(51) Int. Cl.
*G06Q 20/38*    (2012.01)
*G06F 21/53*    (2013.01)
*G06Q 20/32*    (2012.01)

(52) U.S. Cl.
CPC ......... *G06Q 20/3829* (2013.01); *G06F 21/53* (2013.01); *G06Q 20/322* (2013.01); *G06Q 20/3227* (2013.01); *G06Q 20/382* (2013.01); *G06Q 2220/00* (2013.01)

(58) Field of Classification Search
CPC .................................................. G06Q 20/322
USPC .......................................................... 705/71
See application file for complete search history.

(56) References Cited

U.S. PATENT DOCUMENTS

| 2004/0139317 | A1 | 7/2004 | Fronberg | |
| 2015/0052064 | A1* | 2/2015 | Karpenko | G06Q 20/3227 705/71 |
| 2015/0332262 | A1* | 11/2015 | Lingappa | G06Q 20/322 705/71 |

(Continued)

FOREIGN PATENT DOCUMENTS

WO    2015175696 A1    11/2015

OTHER PUBLICATIONS

Japanese Office Action dated Feb. 18, 2020 which was issued in connection with Japanese Patent Application No. 2019-503739 which was filed on Jun. 13, 2017.

(Continued)

*Primary Examiner* — Chinedu C Agwumezie
(74) *Attorney, Agent, or Firm* — Buckley, Maschoff & Talwalkar LLC

(57) ABSTRACT

Provided are a system and method for managing encryption keys used by a payment application on a mobile device. The method includes executing a mobile payment application in a user domain of the mobile device, where the user domain is an operating environment in which applications are executed and accessed by a user, importing a plurality of encryption keys for use by the mobile payment application into a system domain of the mobile device, where the system domain is a more secure operating environment controlled by an operating system, encrypting payment information of the mobile payment application in the system domain using one or more of the imported keys while executing the mobile payment application in the user domain, and transmitting the encrypted payment information to a merchant.

13 Claims, 7 Drawing Sheets

(56) References Cited

U.S. PATENT DOCUMENTS

2017/0352034 A1* 12/2017 Yu ..................... G06Q 20/327
2020/0074465 A1*  3/2020 Agarwal ............ G06Q 20/3829

OTHER PUBLICATIONS

Canadian Office Action dated Aug. 10, 2020 which was issued in connection with Canadian Patent Application 3,031,927.
"Canadian Examination Search Report" dated Nov. 15, 2019, for Canadian Application No. 3,031,927, 3 pp.
European Search Report dated Sep. 25, 2020 which was issued in a counterpart application EP Patent Application No. 17731783.1.
"PCT International Search Report and Written Opinion" dated Jun. 9, 2017 (Sep. 6, 2017), for PCT Application No. PCT/US2017/037211, 12 pp.

* cited by examiner

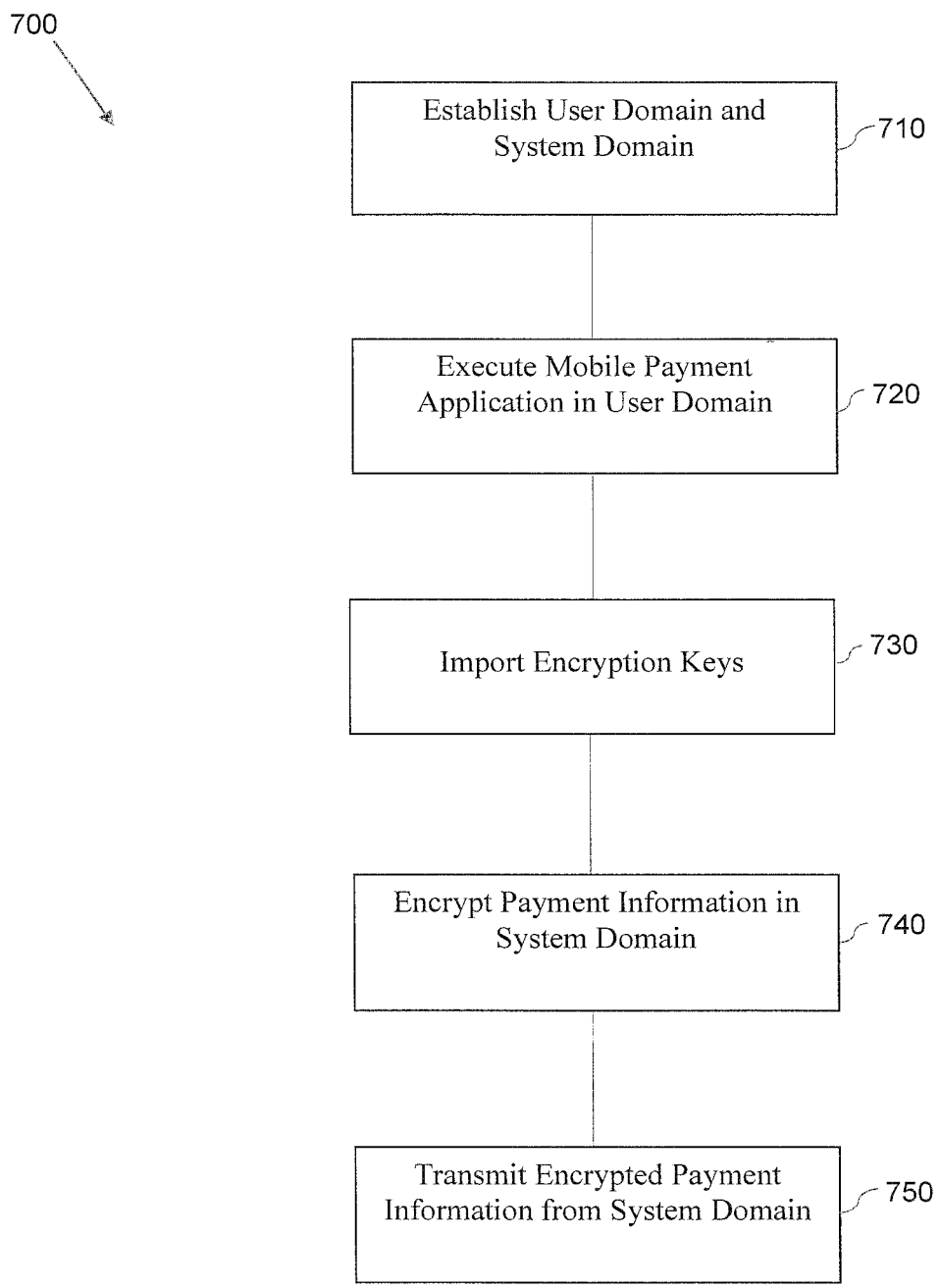

SYSTEM AND METHOD FOR END-TO-END KEY MANAGEMENT

FIELD

Exemplary embodiments described herein relate generally to transactions for the payment of goods and/or services and, more particularly, to enhancing the security of cryptographic keys stored on a mobile device and used during a transaction.

BACKGROUND

Cloud-based payments support the management, generation and provisioning of digital payment credentials into mobile devices to enable simpler and more secure digital payment experiences. Cloud-based payment systems were developed to transition the financial industry from consumer account credentials stored on traditional payment cards to digital credentials provisioned to mobile devices. The digitized credentials enable a consumer's mobile device to perform payments via contactless point-of-sale systems and via remote payments such as in-app payments. Digitized credentials may be stored in digital wallets using a wallet application installed on a mobile device. The digital wallet may be provisioned with sensitive assets such as a card profile and sets of transaction and management keys.

The security models of cloud-based payments rely on a set of countermeasures and a technical design including several controls through the lifecycle of the digital wallet. Risk Management is performed at various levels of the digital wallet, the mobile device and during the online authorization of the transactions in a remote payment case. Monitoring and transaction analysis are used to detect fraudulent use of the digital wallet and take actions that can cause a transaction to be declined or even suspend a digitized card included in the digital wallet or the digital wallet itself.

Like any software based technology, cloud-based payments are a target for several types of attacks that attempt to extract sensitive assets or use the digital wallet in a fraudulent way. Further, financial mobile applications such as digital wallets or mobile banking applications use secure coding techniques that have been around for quite some time. While obfuscation and software tamper development tools may further be used to increase the security level of the mobile applications, there are still a number of gaps in the importation, generation, and use of encryption keys in a user domain of a user device which makes these keys susceptible to attack.

Recently, there have been several attempts to introduce the concept of white-box cryptography (WBC) in an effort to deliver support for secure cryptographic operations in a software based environment. However, WBC requires additional cost, and requires complex management for managing the white-box over the lifecycle of a digital wallet such as the renewal process of the WBC.

BRIEF DESCRIPTION OF THE DRAWINGS

Features and advantages of the exemplary embodiments, and the manner in which the same are accomplished, will become more readily apparent with reference to the following detailed description taken in conjunction with the accompanying drawings, in which:

FIG. 7 is a diagram illustrating a payment method performed in multiple domains of a mobile device in accordance with an exemplary embodiment.

Figure 1:
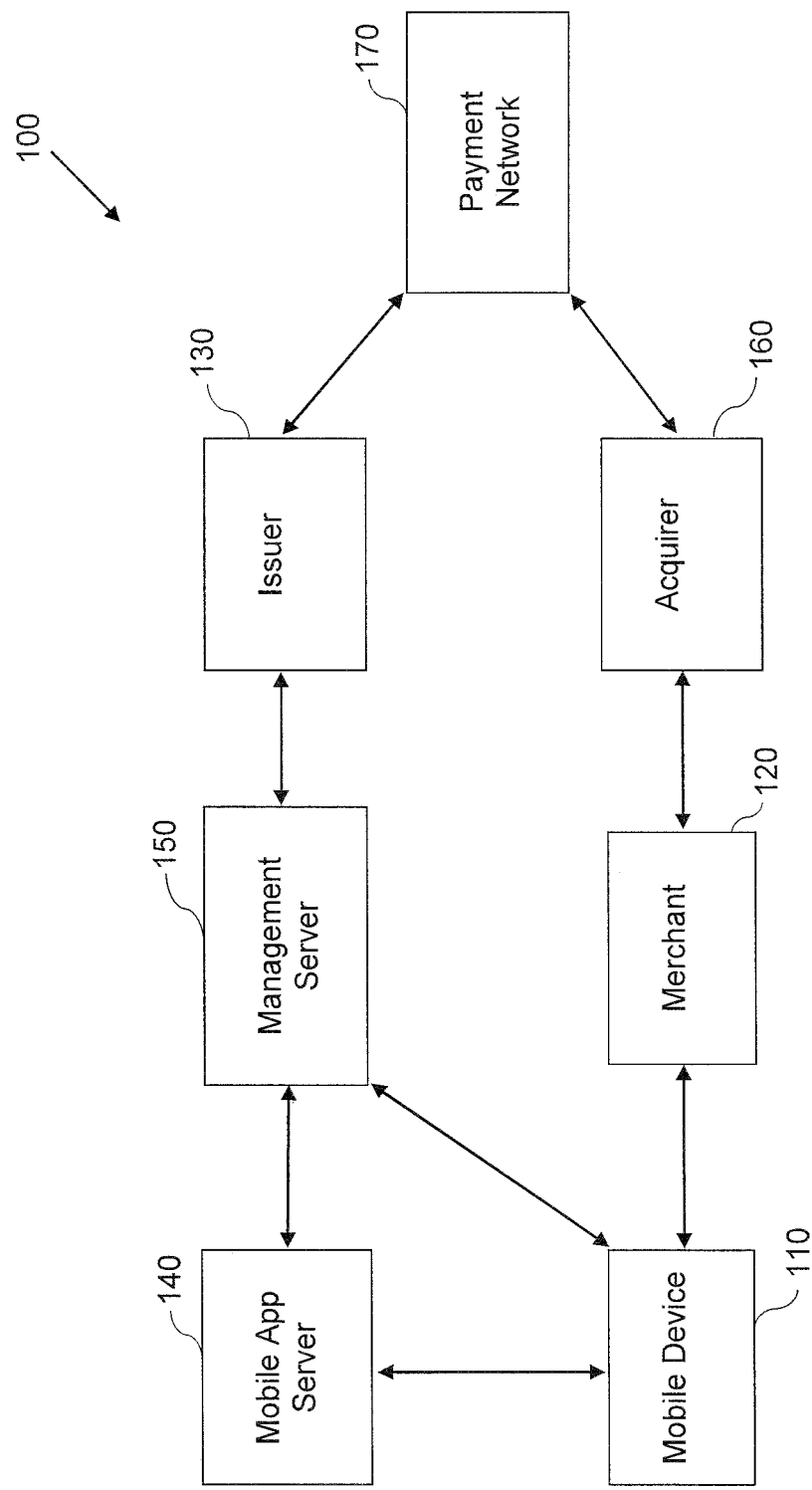
FIG. 1 is a diagram illustrating a token payment system in accordance with an exemplary embodiment.

Throughout the drawings and the detailed description, unless otherwise described, the same drawing reference numerals will be understood to refer to the same elements, features, and structures. The relative size and depiction of these elements may be exaggerated or adjusted for clarity, illustration, and/or convenience.

DETAILED DESCRIPTION

In the following description, specific details are set forth in order to provide a thorough understanding of the various exemplary embodiments. It should be appreciated that various modifications to the embodiments will be readily apparent to those skilled in the art, and the generic principles defined herein may be applied to other embodiments and applications without departing from the spirit and scope of the invention. Moreover, in the following description, numerous details are set forth for the purpose of explanation. However, one of ordinary skill in the art should understand that embodiments may be practiced without the use of these specific details. In other instances, well-known structures and processes are not shown or described in order not to obscure the description with unnecessary detail. Thus, the present disclosure is not intended to be limited to the embodiments shown, but is to be accorded the widest scope consistent with the principles and features disclosed herein.

As described herein, a mobile payment application may be used to perform contactless payments such as through near field communication (NFC), radio frequency identification (RFID), and the like. When performing a contactless transaction the user may tap the mobile device to a contactless reader and proceed with the transaction with authentication of the user through the device or the POS (e.g., online PIN or signature) or both or using noCVM (such as for low value transactions). Also, the mobile payment application may be used to perform remote payments. When performing a remote payment transaction, the user may shop at a merchant online site or use a mobile application and at some stage of the process may be requested to perform a transaction. Accordingly, the user may use a mobile payment application such as a digital wallet to perform the transaction using an internet connection (compared to what is used in the physical world for contactless).

Cloud-based payment systems enable a cardholder to download and install mobile payment applications on a mobile device for use with contactless and remote transactions with a merchant. The cardholder may associate one or more payment accounts with a mobile payment application and use the mobile device to transact through the mobile payment application with the merchant. During a transaction, a number of encryption keys may be used by the cardholder's device to secure sensitive payment account information and other payment data transmitted between the cardholder's mobile device and a merchant and/or payment network.

As a result of the original design of cloud-based payments systems, multiple security gaps exist in the end-to-end management of the encryption keys used by the mobile payment application on a cardholder's device. A gap as described herein occurs at a point when a sensitive asset such as a management key or a transaction key is somehow disclosed within a user domain of the user device which is an untrusted environment, in comparison to a system domain of the user device that is controlled by an operating system (OS) and is more secure than the user domain. Recently, a great deal of efforts have been taken to improve the security level of mobile devices and introduce new security features through a mobile operating system. An example of improved mobile device security is a secure storage such as a keystore. As an example, Android Keystore included in the Android operating system allows cryptographic keys to be stored in a secure digital container on a user device to make it more difficult to extract the keys therefrom. Once the keys are in the keystore, they can be used for cryptographic operations. Moreover, the keystore may provide rules that restrict when and how keys can be used, such as requiring user authentication for key use or restricting keys to be used only in certain cryptographic modes.

According to the exemplary embodiments, the cryptographic keys used during a mobile payment process or contactless payment process may be further secured by incorporating security features from a mobile operating system such as from the Android Keystore within the end-to-end managing of encryption keys during a transaction. A mobile payment application typically stores keys in the user domain by default. In contrast, the exemplary embodiments import and operate keys in the system domain in order to enhance the security features of the mobile device and reduce the number of gaps in the management of the keys. For example, keys may be imported to and executed by a trusted execution environment or hardware elements available to the system domain instead of the user domain.

As described herein, the user domain refers to an environment in which a mobile application such as a digital wallet executes and operates in response to controls from a user, and the system domain refers to a more secure environment which is under the sole control of the operating system. The system domain has access to low level functions including an interface with secure features that may be provided by a trusted execution environment or hardware based mechanisms. Furthermore, there is a strong segregation (e.g., firewall) between the user domain and the system domain of a user device causing access to the system domain to be restricted. Typically, an attacker will target the user domain because it is easier and has significantly more opportunities for access whereas only advanced attackers will attempt to access the system domain which requires a significantly more skilled understanding in order to be breached.

Encryption keys (i.e., keys) may be imported from another device or generated by the mobile device. The keys may be used to perform various operations such as encryption, decryption, signatures, and the like, on data transmitted between the mobile device and a payment network. According to various exemplary embodiments, importation and generation of keys as well as operations using the keys may be performed in the system domain instead of the user domain, thereby preventing the keys from being exposed within the user domain. Furthermore, the exemplary embodiments combine the functions used to manage a keystore within an operating system to increase the security level of the keys such that there is no leak of management keys and transaction keys within the user domain. Accordingly, all of the cryptographic operations, beginning with the secure key import to the actual use of the key, may be performed in the system domain leveraging from the most advanced techniques provided by the operating system, such as the trusted execution environment or an embedded secure element that may be used by the operating system in a restricted and controlled way.

Exemplary embodiments may limit the types of operations that can be performed with the keys in the system domain, for example, the system domain may allow for import but not export, allow for encryption but not decryption (or vice versa), and use access control to restrict the access to a key but leverage from cryptographic properties of a key (such as an asymmetric key) in order to let anyone encrypt data using a public key that is part of the key. Furthermore, the operations involving keys may be combined with additional levels of encryption and decryption to implement additional controls. As an example, the transport of a key or use of a key may be conditioned upon the use of the key to a prior decryption of that key using another key for which access rules are defined.

FIG. 1 illustrates a token payment system 100 in accordance with an exemplary embodiment. Referring to FIG. 1, the token payment system 100 includes a mobile device 110, a merchant computing device 120, an issuer computing device 130, a mobile application server 140, and a management server 150, an acquirer 160, and a payment network 170. It should also be appreciated that the token payment system 100 may include additional devices not shown, for example, a payment gateway, and the like, or one or more of the exemplary devices may be combined and incorporated with one another. It should also be appreciated that the token payment system 100 may include multiple mobile devices 110, merchant computing devices 120, issuer computing devices 130, mobile application servers 140, management servers 150, and acquirer computing device 160.

The token payment system 100 may be a cloud-based payment system that supports contactless payments and remote payments from the mobile device 110 to the merchant 120. For example, the mobile device 110 may download and install a mobile payment application from the mobile application server 140. The payment application may be an issuer-based payment application, a merchant-based application, a digital wallet, and the like. In the example of an issuer-based mobile payment application, payment capability may be integrated into the mobile device 110 as part of an issuer's (such as issuer 130) mobile application, providing the mobile application with credentials to conduct payment transactions. In the example of the digital wallet, payment capabilities may be integrated as part of the digital wallet, and the mobile application server 140 may be a wallet provider that is capable of digitizing one or more payment cards into the same digital wallet.

The user may store tokenized payment account information of one or more payment cards associated with the mobile payment application installed on the mobile device 110. The mobile payment application may include Master-Card MasterPass, Google Wallet, Samsung Pay, Apple Pay, and the like. Payment account information may include a primary account number (PAN), an expiration date, and the like, from payment cards provided by the issuer 130, and can be tokenized and stored on mobile device 110. As another example, the mobile device 110 may store a digital wallet having stored therein tokenized payment information from one or more payment cards provided by any number of issuers, banks, financial entities, and the like, and which have been associated with the digital wallet by the user. As a result, the mobile device 110 may transform into a commerce device capable of making payments to the merchant 120 both remotely and in-person.

The management server 150 may include a plurality of devices, modules, programs, software, and the like. For example, the management server 150 may be controlled by a financial entity such as MasterCard Incorporated, and may include a credential management system (CMS), an account enablement system (AES), a transaction management system (TMS), a token vault, and the like. In these examples, the management server 150 may include or may be connected to a token service providing device. The token service providing device may generate tokens in place of payment card information and store and maintain a mapping or table of information needed for converting tokenized payment information (such as a tokenized PAN) into actual payment information. According to various exemplary embodiments, the management server 150 may store various encryption keys for use with a mobile payment application stored on the mobile device 110 to use during a payment process or transaction. For example, the keys may include master keys for tokens, session keys for use in transactions, management keys, and the like. The keys may be transferred from the management server 150 to the mobile device prior to or during a transaction.

In the example of FIG. 1, the mobile payment application installed on the mobile device 110 provides a front-end interface to a cardholder and manages the user experience from signing-up to the payment service to transacting with the mobile device 110, and manages functions such as changing a personal identification number (PIN). The mobile application server 140 provides the front-end interface to the cardholder and manages the cardholder's user account and may integrate cloud based digitized services for digitizing payment cards into the mobile payment application.

According to various exemplary embodiments, multiple improvements are made to the token payment system 100 in an effort to further enhance the security of payment transactions between the mobile device 110 and the merchant 120. A first wave of improvements is made to the importation, storage and usage of encryption keys by the mobile device 110 by incorporating key importation, key storage and key operations into the system domain of the mobile device 110. A second wave of improvement is made by extending changes to the keys to the credential management system of the management server 150. A third wave of improvements is made by migrating transaction cryptograms of the transaction management system of the management server 150 to a different encryption algorithm, and a fourth wave of changes is made by making changes to the mobile operating system of the mobile device 110.

The management server 150 may include a number of different systems. For example, an account enablement system may provide services to check payment card and device eligibility for cloud-based payment services, perform identification and verification to authenticate a cardholder, digitize payment cards, and coordinate lifecycle management. A token vault may maintain a token to account PAN mapping table. Digitized payment cards may be provisioned into a credentials management system. The credentials management system may store master keys for a token, and generate session keys during a transaction which may be converted into transaction credentials. The credentials management system may combine session keys with a mobile PIN to create transaction credentials and provide them to the mobile payment application to enable the mobile payment application to transact. A transaction management system may process transactions, verify application cryptograms to authenticate the credentials used, and verify that a correct mobile PIN was entered.

A user of the mobile device 110 may attempt to make a payment for a transaction with the merchant 120. For example, the mobile device 110 may make payment using contactless or remote payment capabilities provided by a digital wallet, or other mobile payment application. When the merchant 120 receives payment data from the mobile device 110, the merchant 120 may transmit the payment data to the acquirer 160. The acquirer 160 may transmit the payment data to the payment network 170 for processing. If the payment data includes tokenized payment information, the payment network 170 may transmit the tokenized payment information to the issuer 130 and/or the management server 150 for translation into actual payment information. Also, the issuer 130 may verify whether a payment account corresponding to the payment data has sufficient funds to cover a purchase with the merchant 120. A result of the authorization may be sent back to the merchant 120 through the reverse path.

Although not shown in FIG. 1, the token payment system 100 may further include a remote notification service such as Google Cloud Messaging, Apple Push Notification Service, Microsoft Push Notification Service, and the like. The remote notification service may communicate with the mobile payment application and provide various notifications.

Figure 2:
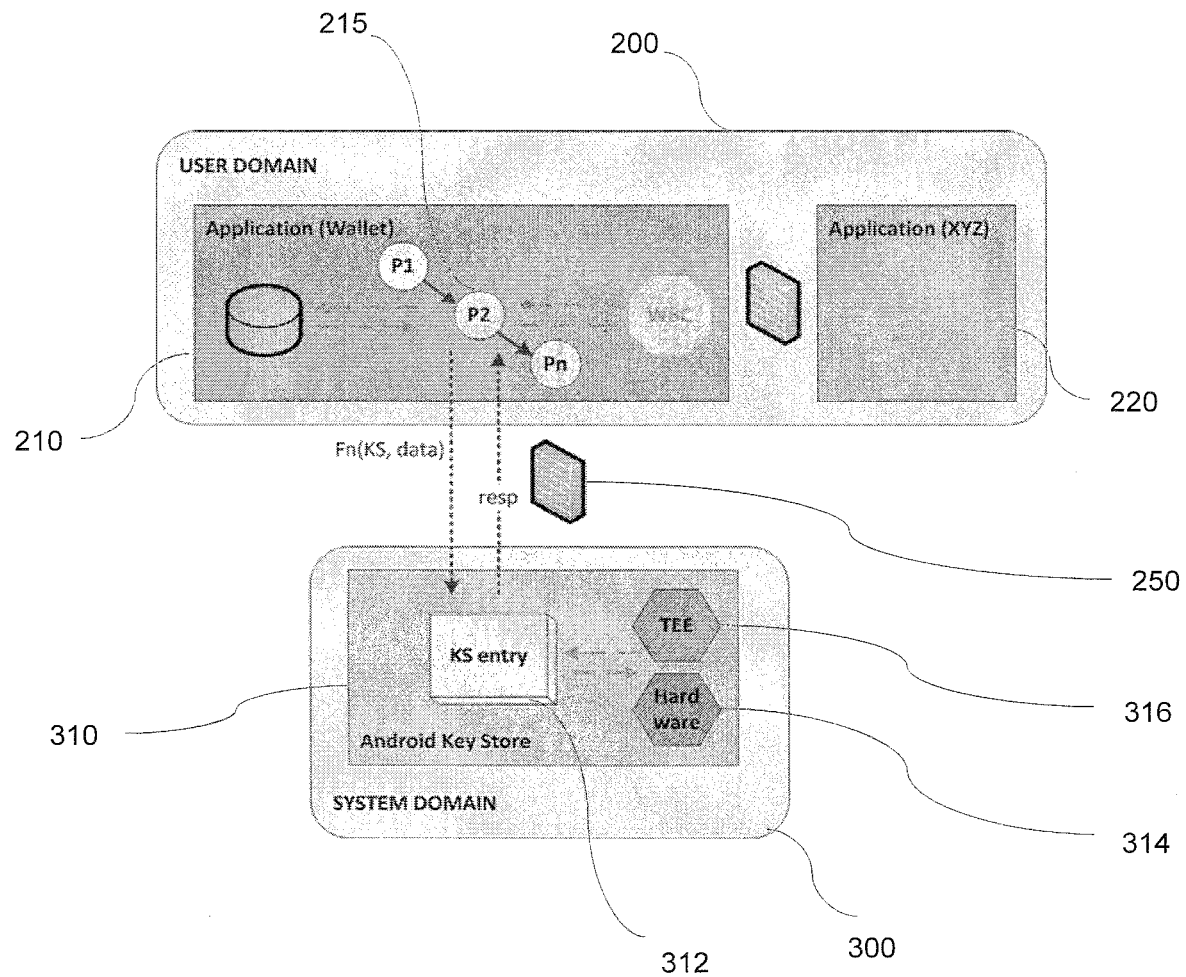
FIG. 2 is a diagram illustrating a mobile operating environment including a user domain and a system domain in accordance with an exemplary embodiment.

FIG. 2 illustrates a mobile operating environment including a user domain 200 and a system domain 300 in accordance with an exemplary embodiment. Referring to FIG. 2, the user domain 200 is an operating environment in which a mobile application may operate such as a mobile payment application, a merchant application, a digital wallet, and the like. The user domain 200 is a domain in which the user may interact with various applications running on the mobile device. When several mobile applications are operated in the user domain 200, an operating system of the mobile device may provide some level of sandboxing between the applications in the user domain 200 in order to control and/or restrict the area that can be accessed by a mobile application.

The system domain 300 is a more secure operating environment that may be under the sole control of the operating system of the mobile device. In various examples, the user or unauthorized mobile applications are not allowed to access data within the system domain 300. The system domain 300 may have access to low level functions and may be an interface with various secure features such as a trusted execution environment (TEE) 316, hardware based mechanisms 314 (e.g., secure elements, storage, crypto-processors), and the like. According to various exemplary embodiments, a keystore 310 is included within the system domain 300 and includes one or more key entries 312 as well as the TEE 316 and the hardware based mechanisms 314. The keystore 310 may be responsible for storing and maintaining cryptographic keys having corresponding entries 312 and identification of their owners. Keys may be imported from the user domain 200 into the keystore 310 of the system domain 300. An example of a keystore is the Android Keystore included in the Android mobile operating system designed by Google. In some examples, a key may be exported from the system domain 300 into the user domain 200, for example, in a case where the key is restricted to a specific type of processing operation and/or conditions within the user domain 200.

In the exemplary embodiments there is a strong segregation, for example, a firewall, between the user domain 200 and the system domain 300. As a result, access to the system domain 300 is very limited. For example, the system domain 300 may be under sole control of the operating system which may prevent applications, devices, and users from accessing the system domain 300 and from accessing encryption keys stored in the system domain 300. Also, the operating system may prevent the type of operations that can be performed in the system domain 300. Because of the strength of the security of the system domain 300, an attacker will typically target the user domain 200 while only the most advanced attackers may attempt to access the system domain 300. Furthermore, access to the secure mechanisms such as the TEE 316 and the hardware based mechanisms 314 used by that system domain 300 may require even more skills in order to use or even breach them.

In the example of FIG. 2, the user domain 200 has a mobile payment application 210 installed and executed therein. For example, the mobile payment application 210 may be a digital wallet, a merchant payment application, an issuer-based payment application, and the like. The user domain 200 may also include other mobile applications 220 that may be executed there within. The mobile payment application 210 includes a plurality of processes (P1, P2, Pn, etc.) 215. In some example, the mobile payment application 210 may also include a white-box cryptography (WBC) component that operates in the user domain 200. The mobile payment application 210 may store information in a database operated in the environment of the user domain 200. According to various exemplary embodiments, the mobile payment application 210 may use the keystore 310 during payment processing and create keystore entries 312 that may be used during the payment processing. For example, each entry in the keystore 310 may be associated with a key (and its alias) and parameters such as an encryption algorithm (such as AES, RSA, ECC . . . ), access rules, and cryptographic functions permitted in the system domain 300 (such as encrypt, decrypt, sign, and the like).

The keystore 310 may operate in the system domain 300 and may leverage security from the trusted execution environment 316 and/or available hardware components 314. In this example, there is a first level of segregation between the applications in the user domain 200. In addition, there is another level of segregation between the user domain 200 and the system domain 300. As a result, the user domain 200 and the system domain 300 may act like layers of an onion or of Russian dolls where each doll forms another layer of protection. In this example, the data stored in the system domain 300 has more layers of protection than data stored in the user domain 200. In some examples, calls to the keystore 310 may not allow the caller to perform a sequence of operations in the keystore entry 312 component within the system domain 300 and only return a final result from the system domain 300 to the user domain 200. As an example, when a cryptographic operation is performed in the system domain 300, a response thereto may be sent back to the user domain 200 and may be potentially exposed to an attacker targeting the user domain 200. Therefore, the keystore 310 may be a hardware secure module that is only able to perform one operation at a time without the ability to store any temporary results or values.

According to various aspects, the system domain 300 may be a slave to the user domain 200. In the example of FIG. 2, the business logic of the wallet 210 (including the mobile payment application) is executed in the user domain 200. However, cryptographic operations may be performed in the system domain 300. Therefore, cryptographic operations may be performed in the system domain 300 as a result of an application programming interface (API) call, or the like, from the user domain 200 to the system domain 300. Here, for example, a process (P2) of the wallet 210 executing in the user domain 200 calls the system domain 300 using fn(KS, data) where fn( ) is a cryptographic function, KS is an alias of the keystore 310, and data is some data to be processed. Next, a response (resp) is transferred from the system domain 300 to the user domain 200. In this example, the keystore 310 is a slave of the processes operated in the user domain 200 and it may be called as needed by the processes included in the wallet 210. The keys included within the keystore 310 may be generated by the keystore 310 in response to a call from the user domain 200, or may be imported to the keystore 310 from the user domain 200. According to various aspects, the keys may be encrypted while in the user domain 200 (either before being imported from the user domain 200 or after being exported into the user domain from the system domain) and are therefore further secured.

Figure 3:
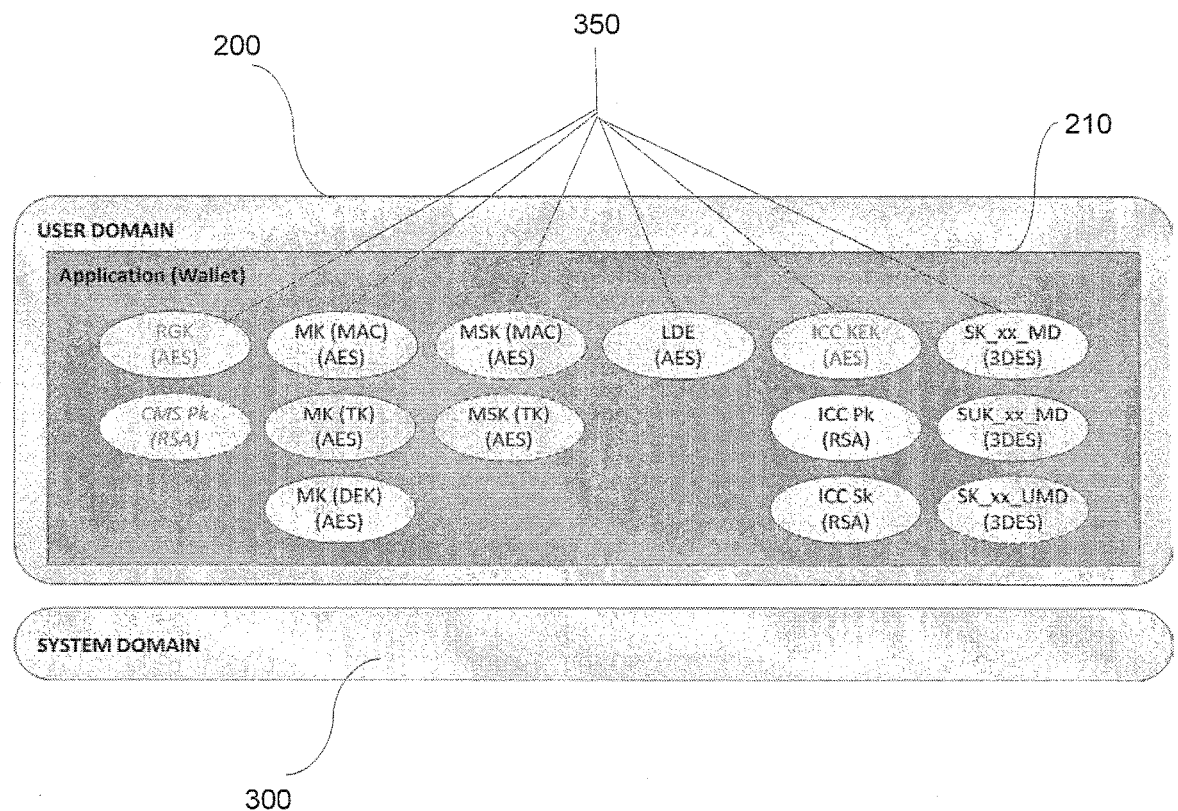
FIG. 3 is a diagram illustrating encryption keys that may be used by a mobile payment application in accordance with an exemplary embodiment.

FIG. 3 illustrates encryption keys that may be used by a mobile payment application 210 in accordance with an exemplary embodiment. Referring to FIG. 3, the mobile payment application 210 includes a plurality of keys imported into or generated in the user domain 200, and used in the user domain 200, whereas the system domain 300 is empty. In this example, the mobile payment application 210 may use a plurality of encryption keys 350 during a payment process. In the examples herein, the term (MK) refers to a mobile key, (MSK) refers to a mobile session key, (ICC) key refers to an integrated circuit card key, and (LDE) key refers to a local database encryption key. Also, AES, RSA, 3DES, and the like, refer to types of encryption in the art.

Cloud-based payments systems may use various security services executed in the user domain 200 when using the mobile payment application 210. Examples of the cloud-based payment encryption services shown in FIG. 3 include random key generation (RGK) by the mobile payment application 210, and RGK export to a credential management system (CMS) where the RGK may be encrypted using an RSA public key provided by CMS. For example, the CMS may be included or connected to the management server 150 shown in FIG. 1. Cloud-based payment encryption services may include mobile keys such as a message authentication code (MAC) mobile key, a transport key (TK), and a data encryption key (DEK) which may be delivered from the CMS and encrypted under RGK, mobile session keys (MAC and TK—AES keys) generated by the mobile payment application 210 using the mobile keys (MAC and TK) and session information as a diversifier, mobile session keys (MAC and TK) used by the mobile payment application as part of a messaging protocol between the mobile payment application and the CMS, mobile key (DEK) that may be used to protect sensitive assets in a card profile (ICC KEK) or set of keys (session keys and single use keys) in a key container provisioned by the CMS, a local database encryption (LDE) key (AES key) generated by the mobile payment application and used to secure storage of data (encryption and decryption), a single use key (3DES key) to session key (3DES key) conversion using a (surrogate) Mobile PIN. The cloud-based payment systems may also perform AC/CVC cryptogram generation using session keys (3DES key), ICC private key decryption using ICC KEK (AES key), and CDA signature generation using the ICC key pair (RSA key).

Figure 4:
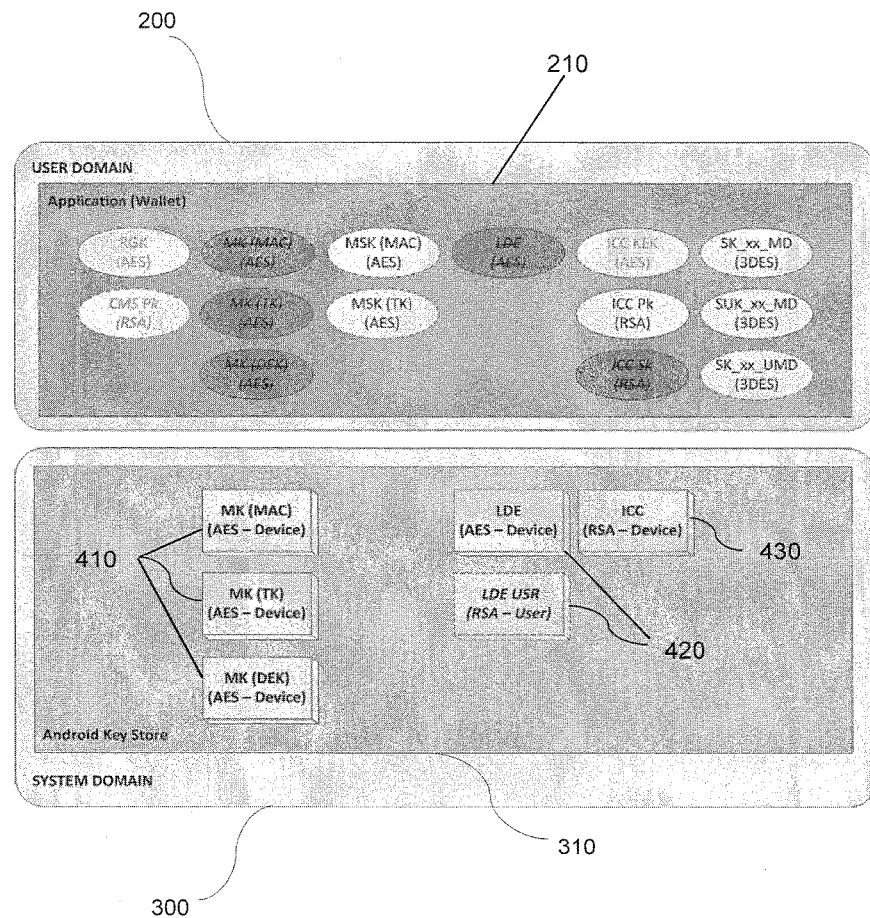
FIG. 4 is a diagram illustrating encryption keys that may be used in the system domain of a mobile device in accordance with an exemplary embodiment.

However, in FIG. 3, the encryption keys are imported into and used by the mobile payment application 210 within the user domain 200. As a result, the keys may be subject to attack by an intruder who gains access to the user domain 200. FIG. 4 illustrates encryption keys that may be used in the system domain 300 in accordance with an exemplary embodiment. In the example of FIG. 4, additional security improvements within the mobile device are supported in comparison to the system of FIG. 3. An operating system of a mobile device may be used to control the system domain 300 based on actions that occur while executing the mobile payment application in the user domain 200.

Referring to FIG. 4, according to various exemplary embodiments, mobile keys 410 (MAC, TK and DEK—AES keys) may be imported into and used by the keystore 310 within the system domain 300 and may have standard device access control. In this example, the standard device access control may not be linked with a user authentication. For example, the mobile keys 410 may be imported from the CMS connected to or included within the management server 150 of FIG. 1. In addition, assets encrypted under the mobile key (DEK) may be managed in the keystore 310 of the system domain 300.

In this example, the mobile payment application may use the keystore 310 in the system domain 300 in order to store the mobile keys 410 and perform the cryptographic operations using the mobile keys 410. The mobile payment application may receive the mobile keys 410 encrypted under the RGK key. In these examples, the mobile payment application may create a MAC keystore entry with parameters such as the encryption algorithm being AES, the access control being standard device with no user authentication, and functions being limited to sign (HMAC generation used to derive the mobile session keys) and "sign" (MAC validation) within the system domain 300. The mobile payment application may also create a TK keystore entry with parameters such as the encryption algorithm being AES, the access control being standard device with no user authentication, and functions being limited to sign (HMAC generation used to derive the mobile session keys) and decryption. The mobile payment application may also create a DEK keystore entry with parameters such as the encryption algorithm being AES, the access control being standard device with no user authentication, and functions being limited to decrypt and encrypt.

The mobile keys MAC, TK, and DEK 410 may be imported (in clear) into the keystore 310. The mobile key MAC (ksMkMac) may be used to validate the MAC computed over a remote notification message sent by the CMS when delivering the information about the session to be established by the mobile payment application. Also, the mobile key MAC (ksMkMac) may be allowed to generate the MAC mobile session keys that are returned to the mobile payment application 210 executing in the user domain 200 during a payment process. The mobile key TK (ksMkTk) may be used to decrypt the encrypted content of the remote notification message sent by the CMS when delivering the information about the session to be established by the mobile payment application. Also, the mobile key TK (ksMkTk) may be used to generate the TK mobile session keys that are returned to the user domain 200. The mobile key DEK may be allowed to decrypt and/or encrypt data at field level.

In the example of FIG. 4, decryption of the mobile keys 410 may be performed by the mobile payment application executing in the user domain 200 but the mobile keys 410 may be immediately imported to the keystore 310 of the system domain 300 identified using the KS aliases. When the importation process is completed, the mobile keys 410 may be wiped or erased from the user domain 200. From that point all cryptographic operations may be performed using the mobile keys (MAC, TK and DEK) 410 using the keystore 310 in the system domain 300. When the mobile key MAC and mobile key TK are used to generate mobile session keys in the system domain 300, the mobile session keys may be returned to the mobile payment application 210 of the user domain 200. The cryptographic operations using the mobile session keys may be performed in the user domain 200 and therefore may be potentially exposed to an attacker targeting the user domain 200. However, a mobile session key may only be valid for one session between the mobile payment application and the CMS using a session identifier defined by the CMS. Furthermore, when integrating the list of security improvements described herein, the role of the mobile session keys may become less critical, and therefore, even if an attacker is able to target the mobile session keys, additional security countermeasures would need to be defeated in order to gain access to the sensitive assets such as the transaction keys (encrypted under the mobile key DEK).

According to various exemplary embodiments, the LDE keys 420 may be generated and used in the keystore 310 of the system domain 300. For example, the mobile payment application may delegate the generation of the LDE keys 420 to the keystore 310 and all the cryptographic operations may be performed in the system domain 300 instead of implementing a process to define the LDE keys 420 and perform all the operations in the user domain 200. The LDE keys 420 may be randomly generated by the keystore 310 in the system domain 300. From that point all the cryptographic operations done using the LDE keys 420 may be performed using the keystore 310 in the system domain 300 without any exposure of the LDE keys 420 to the user domain 200 (i.e., the mobile payment application in the user domain 200). The LDE keys 420 may include an LDE key with user access control (LDEUSR key). The LDEUSR key may be randomly generated by the keystore 310 and may have a public key that is provided to the mobile payment application running in the user domain 200. The LDEUSR key may be used to decrypt data that is stored in a local database used by the mobile payment application. The encryption process may be performed in the user domain 200 by the mobile payment application using the public key without requiring any access to the encryption feature of the keystore 310.

According to various exemplary embodiments, the ICC key pair 430 may be imported into and used in the keystore 310 of the system domain 300. The mobile payment application may receive the ICC key pair 430 and its components (p, q, dp, dq and u) from the CMS as part of the card profile of a cardholder corresponding to the mobile payment application. The components required to reconstruct the key pair may be encrypted under the key ICC KEK. The ICC KEK may be part of the card profile of the cardholder and may be encrypted under the Mobile Key (DEK). The mobile payment application may use the keystore 310 to store the ICC key pair 430 and perform the generation of a CDA signature in the system domain 300.

Cloud-based payment systems may integrate by design the concept of local data authentication (LDA) that is a variant of CDA in order to prevent any misuse of the ICC key pair 430 in order to perform successful offline transactions. The additional level of protection of the ICC key pair 430 is especially relevant in an environment such as transit which attempts to prevent any uncontrolled export or leak of sensitive assets that could be used in a model supporting a concept of deferred online authorization (that is the transaction cryptogram is not validated in real time at time of the transaction). When using transit, a valid CDA signature could be used (even with a wrong transaction cryptogram) in order to pass the transit gates before the PAN associated with the digitized card will be blacklisted as result of a failure at time of validating the transaction cryptograms.

The mobile payment application may create an ICC key pair keystore entry with parameters such as the encryption algorithm being RSA, the access control being standard device with no user authentication, and the function being limited to sign (CDA generation). The mobile payment application may use the mobile key DEK to decrypt the ICC KEK. The decryption of each CRT component using the ICC KEK may be performed in the user domain and the ICC key pair 430 may be immediately imported to the keystore 310. As soon as the importation process is completed the ICC KEK and the CRT components may be wiped from the user domain 200. From that point the cryptographic operation (that is generating a CDA signature) done using the ICC key pair 430 may be performed using the keystore 310 in the system domain 300.

An additional keystore 310 entry (RSA key) may be used to provide a means to strengthen the storage with a specific access control to keys. Using that improvement, the access to UMD keys may require an authentication of the cardholder using the mobile device (such as when using Device CDCVM as part of the device unlock process using fingerprint). This optional feature adds a level of encryption to the UMD session keys in order to condition the access to the UMD keys to a successful authentication of the cardholder on the mobile device (using Device CDCVM). The wallet may create a LDEUSR key keystore entry with parameters such as the algorithm being RSA (or ECC), the access control being user authentication (device unlock), and the function being limited to decrypting. The LDEUSR key may be randomly generated by the keystore 310 in the system domain 300. The public key component may be retrieved and stored in the user domain 200.

The mobile payment application may store encrypted MD session keys (SK_xx_MD) and an encrypted IDN value. Encrypted UMD single use keys (SUK_xx_UMD) (encrypted under the mobile key DEK) may be encrypted by the mobile payment application using the RSA public component (Pk) before storage in the local encrypted database. Here, the public key may be available in the user domain 200 and may be used anytime by the mobile payment application without any user access control. Access to the UMD single use keys at time of the transaction may be protected by the access control rules associated with the RSA private component (Sk) as the UMD keys may be decrypted in the system domain 300 using the RSA private component (Sk) only if a successful authentication of the cardholder has been performed at a level of the mobile device (Device CDCVM). A second decryption may be performed using the mobile key DEK in order to retrieve the assets protected by the mobile key DEK such as the UMD and MD keys and the IDN value.

Figure 5:
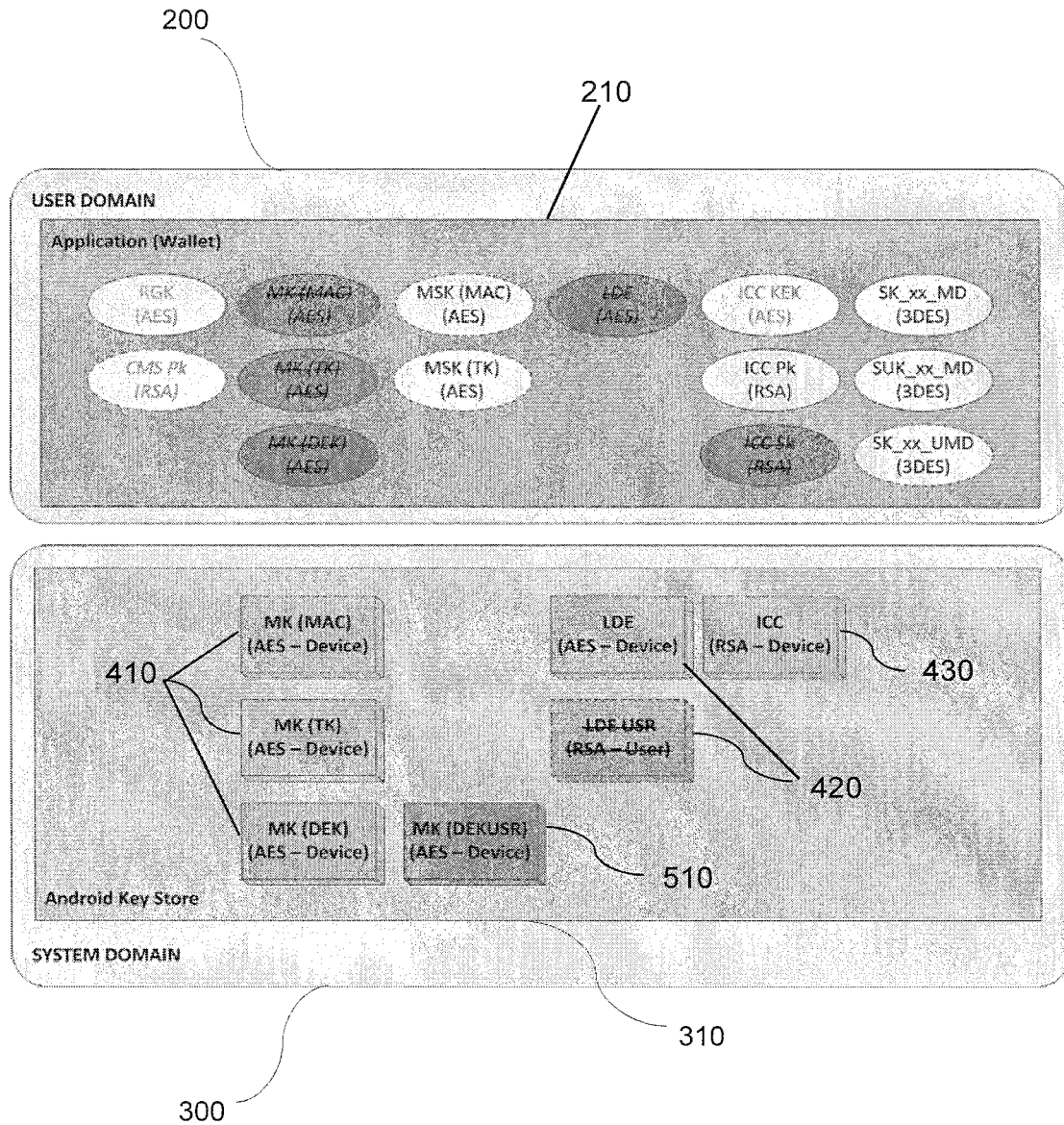
FIG. 5 is a diagram illustrating encryption keys that may be used in the system domain of a mobile device in accordance with another exemplary embodiment.

FIG. 5 illustrates encryption keys that may be used in the system domain 300 in accordance with another exemplary embodiment. In this example, the CMS of the network management server 150 may be updated according to various exemplary embodiments, and a second wave of improvements may be implemented into the token payment system 100 of FIG. 1. Referring to FIG. 5, a newly created mobile key for a mobile payment application according to various exemplary embodiments (mobile key DEKUSR 510) is imported into the keystore 310 of the system domain 300 and is used to encrypt and decrypt data during execution of the mobile payment application. A user authentication may be requested in order to use the mobile key DEKUSR 510.

In this example, communication between the mobile payment application and the CMS may use a messaging protocol in which data is protected using mobile session keys (MAC and TK) 410 at transport level and mobile key (DEK) 410 for field encryption. Several options have been analyzed to integrate the concept of field encryption linked with user access control. Solutions using asymmetric cryptography have been discarded as result of the potential impact on the performance of the system with a limited benefit as no secure key import is defined today to communicate with a keystore. According to various exemplary embodiments, when using this security improvement the mobile key DEKUSR 510 is introduced in order to move the integration of user access control at a level of the CMS thereby strengthening the rules for access control upfront in the provisioning process. As a result of the introduction of mobile key DEKUSR 510, the LDEUSR key 420 may not be used and the associated process may no longer be used at the level of the mobile payment application. In the example of FIG. 5, the mobile payment application may create a keystore 310 entry for the mobile key DEKUSR 510 in which an encryption algorithm is set to AES, access control is set to user authentication (device unlock), and the functions are set for encrypt and decrypt.

In the example of FIG. 5, there is an optional use for white-box cryptography (WBC) for cryptogram generation. An issuer or wallet provider (i.e., mobile payment application provider) that is willing to extend the end-to-end protection of transaction session keys may consider WBC as an option to improve the security level of Cloud-based payment system and use its own customized version of a software development kit (SDK). The objective is to reduce the exposure of the transaction keys in the user domain 200 and leverage from WBC executed in the user domain 200 to decrypt keys and generate transaction cryptograms using a process implemented in a WBC component. In this case, the CMS would need to know the value of a transport key (AES) shared between the WBC component of the wallet and the CMS. The customized version of the CMS-D will need to encrypt the transaction session keys and these encrypted keys would be delivered to the wallet using the improved mechanisms described herein. In this example, the WBC component in the wallet may implement a sequence of operations using a single call to the WBC component in order to decrypt the encrypted transaction session keys and keep the ephemeral value of the transaction session keys and generate the transaction cryptograms using the transaction session keys. In this case, an additional encryption using a WBC key is performed by the CMS to prepare data that will be used by the WBC component of the wallet. Each record may be stored and encrypted under the LDE key 420. The support of WBC may be provided by WBC vendors as part of a customized SDK released while the priority for security improvements may be on the keystore 310 (that is a standard feature of an operating system of a mobile device).

A third wave of security improvements may be made to a transaction management system (TMS) included in or connected to the management server 150. In some cases, the keystore 310 may not include 3DES as part of the list of supported algorithms. As a result, it may be difficult to deliver an end-to-end solution for key management using a keystore that is able to generate transaction cryptograms from the keystore (system domain 300) instead of generating the transaction cryptograms from the user domain 200 using transaction session keys that are potentially exposed to an attacker targeting the user domain 200. According to various exemplary embodiments, another way to address the problem is to use AES support as defined in Android Keystore and migrate from 3DES to AES the transaction cryptograms generation (at wallet level) and validation (at TMS level). When using AES as the algorithm for transaction cryptograms management, the following operations are expected to remain unchanged in order to avoid additional changes to the CMS responsible of the data preparation: the algorithm used for magnetic stripe IVCVC3 value generation remains unchanged and uses MAC with a 3DES Key (CMK_CL_UMD), the algorithm for session key generation (SK_CL_MD or SK_CL_UMD) using the card master key (CMK_CL_MD or CMK_CL_UMD) and the ATC as diversifier remains unchanged and uses the EMV CSK method with 3DES keys without any adjustment of the derived key for parity, and the length of the transaction session keys (SK_xx_MD and SK_xx_UMD) is 16 bytes and remains unchanged when using AES (16 bytes) instead of 3DES (using two keys of 8 bytes). The cryptogram generation (and validation) process that is used for EMV and for magnetic stripe transaction is harmonized and one common process using a MAC Algorithm using a 16-byte block cipher (AES) can be used for AC or CVC3 generation. The difference between the EMV versus the magnetic stripe transaction is the list of data that is used to define the message (MSG) to be MACed. The preparation of the message (including the padding process) is done in the user domain 200 while the generation of the cryptogram is performed using the keystore in the system Domain 300 without any exposure of the transaction keys to the user domain 200. The full strength of the solution will be achieved when a secure key import of the transaction keys to the keystore is available. When validating transactions, the TMS will have to identify wallets (for example using a specific PAN range) that support AES instead of 3DES for cryptogram generation. The hardware secure module used by the TMS will have to be updated in order to support MAC validation using a MAC algorithm using a 16-byte block cipher (AES) instead of using a MAC algorithm using an 8-byte block cipher (3DES).

A fourth wave of improvements may be made using an updated mobile operating system. For example, when using Android Keystore as defined in Android MarshMallow (Android M-API 23+), the key may be generated randomly by the Keystore or imported into the Keystore. When using the import feature, the key is available in clear in the user domain 200 prior to its load into the Keystore in the system domain 300. Keys that are eligible to be imported into Keystores (such as mobile keys or transaction keys) are potentially exposed to an attacker targeting the user domain and no end-to-end key management can be deployed today between the CMS-D and the Android Keystore in the system domain 300. According to various exemplary embodiments, a secure key import may be supported using a mechanism that is defined by an operating system provider. If needed the provider of management server 150 such as MasterCard Incorporated can provide some options for the process to be used but it is expected to adjust their processes (such as the provisioning of keys done by the CMS) to the solution that is expected to be made available through a new API.

Figure 6:
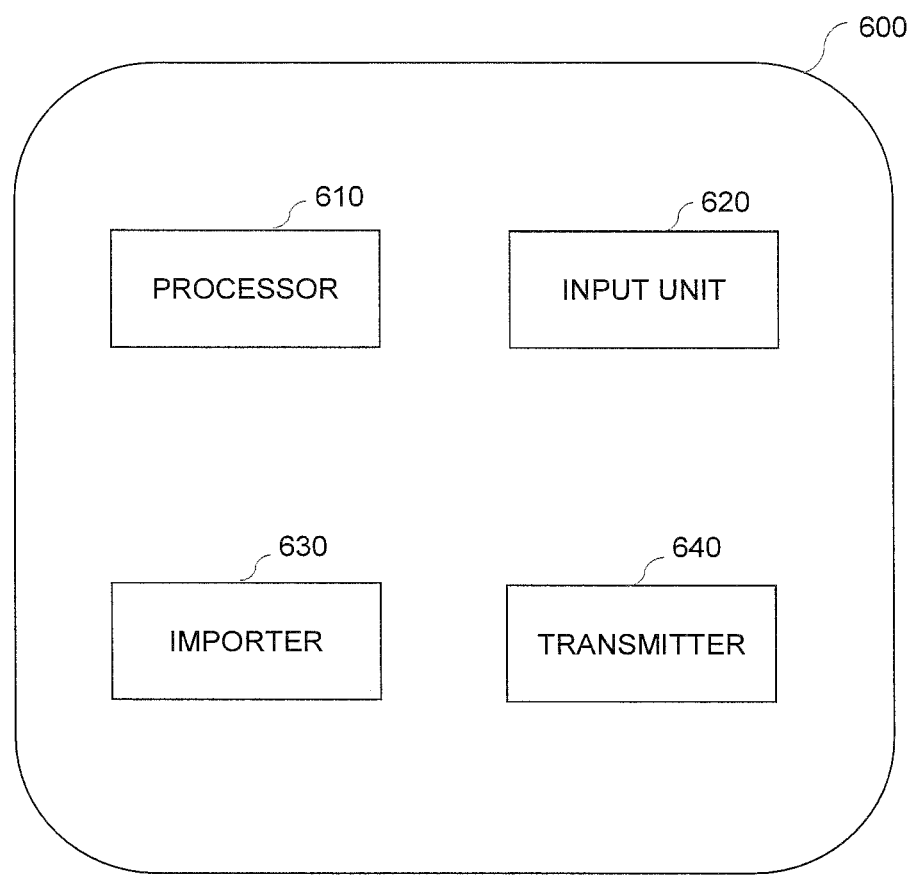
FIG. 6 is a diagram illustrating a mobile device in accordance with an exemplary embodiment.

FIG. 6 illustrates a mobile device 600 in accordance with an exemplary embodiment. Referring to FIG. 6, the mobile device 600 includes a processor 610, an input unit 620, an importer 630, and a transmitter 640. As a non-limiting example, the mobile device 600 may be a mobile phone, a tablet, a laptop computer, a phablet, a personal computer, an appliance, a television, and the like. Also, the mobile device 600 may include a mobile operating system or operating system implementing one or more of the exemplary embodiments described herein. The mobile device 600 may correspond to the mobile device 110 shown in FIG. 1. The mobile device 600 may also include one or more components that are not shown in FIG. 6, for example, a receiver, a network interface, an output unit, and the like.

According to various examples, the mobile device 600 may download and install a mobile payment application such as the mobile payment application 210 shown in FIG. 2. As a non-limiting example, the mobile payment application may be a digital wallet, a merchant application, an issuer-based payment application, and the like. A user of the mobile device 600 may use the input unit 620 to input commands and verify identify of the user as a cardholder corresponding to payment accounts included in the mobile payment application. The input unit 620 may include a keypad, a touchpad, a mouse, a speech recognition module, a motion recognition module, and the like, for receiving typed, touch, entered, spoken, or captured input from the user.

The processor 610 may execute the mobile payment application in a user domain of the mobile device 600 in response to receiving a command input by the user through the input unit 620. As described herein, the user domain may include an operating environment in which mobile applications are executed and accessible to the user of the mobile device. The importer 630 may import a plurality of encryption keys for use by the mobile payment application into a system domain of the mobile device 600. For example, the importer 630 may import the keys into a keystore included in the system domain. According to various aspects, the system domain may have a more restricted operating environment than the user domain and may be controlled by an operating system of the mobile device 600. For example, the system domain may not be accessible by the user of the mobile device 600 and may be under sole control of the operating system. An example of the operating system includes Google Android, Apple iOS, Windows Phone OS, and the like.

The processor 610 may encrypt payment information of the mobile payment application in the system domain using one or more of the imported keys while executing the mobile payment application in the user domain. For example, the processor 610 may encrypt payment information from one or more payment cards associated with the mobile payment application. As an example, the encrypted payment information may include a primary account number (PAN), an expiry, a card security code, a PIN, tokenized payment information, and the like. As another example, the encrypted payment information may include payment data such as messages transmitted between the mobile device 600 and a payment network, CMS, management server, and the like. Accordingly, by importing the keys into the system domain and encrypting payment information in the system domain, sensitive cardholder information and sensitive payment application information (i.e., keys, encryption operations, payment information, etc.) may be prevented from being exposed in the user domain and may be restricted to the system domain. Also, the system domain may include additional layers of protection from the user domain. For example, a firewall may be implemented between the user domain and the system domain thereby further protecting the system domain should an attacker gain access to the user domain.

The transmitter 640 may transmit the encrypted payment information to a merchant (i.e., a merchant server or other computing device) in an effort to pay for a transaction with the merchant for goods and/or service. According to various exemplary embodiments, the transmitter 640 may transmit the encrypted payment information from the system domain directly to the merchant without transferring the encrypted payment information through the user domain. Accordingly, sensitive encrypted data may be prevented from being exposed within the user domain of the mobile device 600 and may be restricted to be imported and operated within the system domain.

The plurality of encryption keys imported by the importer 630 into the system domain (e.g., received by the system domain) may include various keys such as public keys, private keys, mobile keys, mobile session keys, randomly generated keys, and the like. For example, the encryption keys may include at least one mobile key for decrypting content received from a credential management system (CMS) and encrypting content to be sent to the CMS. As another example, the plurality of encryption keys may include an integrated circuit card (ICC) key pair for generating a CDA signature. In addition to importing keys into the system domain, the processor 610 may generate encryption keys in the system domain for use with the mobile payment application and store the generated encryption key in a keystore of the system domain. For example, the processor 610 may generate a local database encryption (LDE) key for decrypting and encrypting data stored in a local database used by the mobile payment application.

FIG. 7 illustrates a payment method 700 performed in multiple domains of a mobile device in accordance with an exemplary embodiment. Referring to FIG. 7, in 710 a user domain and a system domain are established within the mobile device. The user domain may include an operating environment in which mobile applications are executed and accessible to a user of the mobile device. The system domain may have a more restricted operating environment than the user domain and may be controlled by an operating system of the mobile device. According to various exemplary embodiments, the system domain may be a more heavily controlled operating environment than the user domain. The system domain may have limited access thereto and limits on types of operations that may be performed therein. As an example, the system domain may be regulated or otherwise controlled by the operating system.

In 720, the method includes executing a mobile payment application in the user domain of the mobile device and in 730 the method includes importing a plurality of encryption keys for use by the mobile payment application into a system domain of the mobile device. Although the step of executing the mobile payment application is ahead of the importing, it should be appreciated that the exemplary embodiments are not limited thereto. For example, the encryption keys may be imported prior to executing the mobile payment application. As another example, the encryption keys may be imported at the same time that the mobile payment application is executing. In 740, the method further includes encrypting payment information of the mobile payment application in the system domain using one or more of the imported keys while executing the mobile payment application in the user domain. According to various exemplary embodiments, the type of operations or functions that may be performed by each key may be prevented or limited by the operating system of the mobile device. For example, a key may be restricted to only being used for encryption, and not decryption (or vice versa). As another example, a key may be imported into the system domain, but not exported. In 750, the method further includes transmitting the encrypted payment information to a merchant such as a merchant server or a third party server running a merchant website. Here, the transmitting may include transmitting the encrypted payment information from the system domain directly to the merchant without transferring the encrypted payment information through the user domain.

In the example of FIG. 7, the importing may include importing the plurality of encryption keys into a keystore operated in the system domain. In this case, a firewall may exist between the user domain and the system domain thus adding another layer of protection to the data stored in the system domain. Also, the system domain may not be accessible by the user of the mobile device and may be under sole control of the operating system. As a result, the encryption keys may be stored and operated in a more secure environment during a payment process using a mobile payment application executing in the user domain. For example, the plurality of encryption keys may include at least one mobile key for decrypting content received from a credential management system (CMS), an integrated circuit card (ICC) key pair for generating a CDA signature, and the like. Also, one or more encryption keys may be generated in the system domain and stored in the system domain, such as in a keystore. As an example, a local database encryption (LDE) key may be generated for decrypting and encrypting data stored in a local database used by the mobile payment application.

According to various exemplary embodiments, described herein is a system and method for securing encryption keys of a mobile payment application. The exemplary embodiments import, execute, deport, and transmit and receive encryption keys used by a payment application through a system domain of a mobile device. The system domain may be under the sole control of a mobile operating system, thereby limiting the access to the encryption keys, and limiting operations that are capable of being performed using the encryption keys.

As used herein, the terms card, transaction card, financial transaction card, payment card, and the like, refer to any suitable transaction card, such as a credit card, a debit card, a prepaid card, a charge card, a membership card, a promotional card, a frequent flyer card, an identification card, a gift card, and the like. As another example, the terms may refer to any other device or media that may hold payment account information, such as mobile phones, smartphones, personal digital assistants (PDAs), key fobs, computers, and the like. The transaction card can be used as a method of payment for performing a transaction.

As will be appreciated based on the foregoing specification, the above-described examples of the disclosure may be implemented using computer programming or engineering techniques including computer software, firmware, hardware or any combination or subset thereof. Any such resulting program, having computer-readable code, may be embodied or provided within one or more non transitory computer-readable media, thereby making a computer program product, i.e., an article of manufacture, according to the discussed examples of the disclosure. For example, the non-transitory computer-readable media may be, but is not limited to, a fixed drive, diskette, optical disk, magnetic tape, flash memory, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

The computer programs (also referred to as programs, software, software applications, "apps", or code) may include machine instructions for a programmable processor, and may be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, programmable logic devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal that may be used to provide machine instructions and/or any other kind of data to a programmable processor.

The above descriptions and illustrations of processes herein should not be considered to imply a fixed order for performing the process steps. Rather, the process steps may be performed in any order that is practicable, including simultaneous performance of at least some steps.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method of a mobile device, comprising:
   executing, by a mobile device, a mobile payment application in a user domain of the mobile device;
   storing, by the mobile device, a keystore in a system domain of the mobile device;
   storing, by the mobile device, a plurality of encryption keys of the mobile payment application into the keystore of a mobile operating system of the mobile device in a system domain;
   receiving, by the mobile device, via the system domain, an application programming interface (API) call from the user domain comprising an identifier of a cryptographic function, an identifier of the keystore, and an identifier of data to be encrypted;
   in response to the API call,
      selecting a cryptographic function using the identifier of the cryptographic function;
      selecting the keystore using the identifier of the keystore;
      retrieving the encryption key from the keystore corresponding to the cryptographic function;
      selecting payment information of the mobile payment application using the identifier of the data to be encrypted;
      encrypting the payment information; and
      transmitting, by the mobile device, the encrypted payment information to a merchant.

2. The method of claim 1, wherein a firewall exists between the mobile payment application in the user domain and the encryption keys stored in the keystore of the mobile operating system.

3. The method of claim 1, wherein the plurality of encryption keys stored in the keystore of the mobile operating system comprise at least one mobile key.

4. The method of claim 1, wherein the plurality of encryption keys stored in the keystore of the mobile operating system comprise an integrated circuit card (ICC) key pair.

5. The method of claim 1, further comprising generating, by the mobile device, an encryption key in the system domain and storing the generated encryption key in the keystore of the mobile operating system in the system domain.

6. The method of claim 5, wherein the generated encryption key comprises a local database encryption (LDE) key.

7. A mobile device, comprising:
   a processor;
   a user domain;
   a system domain; and
   a non-transitory computer-readable medium storing executable instructions, that when executed by the processor causes the processor to perform the steps of:
      executing a mobile payment application in the user domain,
      storing a keystore in the system domain,
      storing a plurality of encryption keys of the mobile payment application in the keystore,
      receiving, via the system domain, an application programming interface (API) call from the user domain comprising an identifier of a cryptographic function, an identifier of the keystore, and an identifier of data to be encrypted; and
      in response to the API call,
      selecting a cryptographic function using the identifier of the cryptographic function,
      selecting the keystore using the identifier of the keystore,
      retrieving the encryption key from the key store corresponding to the cryptographic function,
      selecting payment information of the mobile payment application using the identifier of the data to be encrypted,
      encrypting the payment information, and
      transmitting the encrypted payment information to a merchant.

8. The mobile device of claim 7, wherein a firewall exists between the system domain and the user domain.

9. The mobile device of claim 7, wherein the plurality of encryption keys stored in the keystore comprise at least one mobile key.

10. The mobile device of claim 7, wherein the plurality of encryption keys stored in the keystore of the mobile operating system comprise an integrated circuit card (ICC) key pair.

11. The mobile device of claim 7, wherein the non-transitory computer-readable medium stores executable instructions that when executed by the processor causes the processor to perform the steps of: generating an encryption key in the system domain and storing the generated encryption key in the keystore of the mobile operating system.

12. The mobile device of claim 10, wherein the generated encryption key comprises a local database encryption (LDE) key.

13. A non-transitory computer readable medium having stored therein instructions that when executed by a computer comprising a user domain and a system domain, causes the computer to perform a method comprising:
   executing a mobile payment application in the user domain;
   storing a keystore in the system domain;
   storing a plurality of encryption keys of the mobile payment application in the keystore;
   receiving, via the system domain, an application programming interface (API) call from the user domain comprising an identifier of a cryptographic function, an identifier of the keystore, and an identifier of data to be encrypted;
   in response to the API call,
      selecting a cryptographic function using the identifier of the cryptographic function,
      selecting the keystore using the identifier of the keystore,
      retrieving the encryption key from the keystore corresponding to the cryptographic function,
      selecting payment information of the mobile payment application using the identifier of the data to be encrypted,
      encrypting the payment information, and
      transmitting the encrypted payment information to a merchant.

* * * * *